(12) United States Patent
Rexhepi et al.

(10) Patent No.: US 9,380,496 B2
(45) Date of Patent: Jun. 28, 2016

(54) METHOD OF HANDOVER OF CIRCUIT-SWITCHED VOICE CALL TO PACKET-SWITCHED VOICE CALL

(75) Inventors: Vlora Rexhepi, Den Hoom (NL); Iuliana Marinescu, Espoo (FI); Guillaume Sebire, Espoo (FI)

(73) Assignee: Nokia Technologies Oy, Espoo (FI)

(*) Notice: Subject to any disclaimer, the term of this patent is extended or adjusted under 35 U.S.C. 154(b) by 991 days.

(21) Appl. No.: 12/521,187

(22) PCT Filed: Dec. 19, 2007

(86) PCT No.: PCT/IB2007/004019
§ 371 (c)(1),
(2), (4) Date: Feb. 18, 2010

(87) PCT Pub. No.: WO2008/081267
PCT Pub. Date: Jul. 10, 2008

(65) Prior Publication Data
US 2010/0172323 A1     Jul. 8, 2010

Related U.S. Application Data

(60) Provisional application No. 60/877,620, filed on Dec. 29, 2006.

(51) Int. Cl.
*H04W 36/00*     (2009.01)
*H04W 76/04*     (2009.01)
*H04W 80/04*     (2009.01)
*H04W 88/06*     (2009.01)

(52) U.S. Cl.
CPC ...... *H04W 36/0016* (2013.01); *H04W 36/0022* (2013.01); *H04W 76/04* (2013.01); *H04W 80/04* (2013.01); *H04W 88/06* (2013.01)

(58) Field of Classification Search
None
See application file for complete search history.

(56) References Cited

U.S. PATENT DOCUMENTS

| | | | |
|---|---|---|---|
| 6,483,600 B1 * | 11/2002 | Schuster et al. | 358/1.15 |
| 6,650,632 B1 * | 11/2003 | Volftsun et al. | 370/352 |
| 2005/0163106 A1 * | 7/2005 | Vaittinen et al. | 370/352 |
| 2006/0159059 A1 | 7/2006 | Vaittinen et al. | |
| 2006/0229101 A1 * | 10/2006 | LaBauve et al. | 455/560 |

(Continued)

FOREIGN PATENT DOCUMENTS

EP      1734782 A     12/2006

OTHER PUBLICATIONS

3GPP TS 23.882 v.1.4.2: Voice Call Continuity (VCC) from LTE to 2G/3G.

(Continued)

*Primary Examiner* — Mohammad Adhami
(74) *Attorney, Agent, or Firm* — Mintz Levin Cohn Ferris Glovsky and Popeo, P.C.

(57) ABSTRACT

A method, for example, is described in the present application. Such a method can include detecting or establishing a circuit-switched call. The method can also include establishing a voice-over-internet-protocol standby call in parallel to the circuit-switched call. The method can additionally include activating the voice-over-internet-protocol standby call to become an active voice-over-internet protocol call when a handover situation is detected. The method can further include releasing resources of the circuit-switched call when the voice-over-internet-protocol standby call becomes the active voice-over-internet protocol call.

14 Claims, 10 Drawing Sheets

(56) References Cited

U.S. PATENT DOCUMENTS

| | | | | |
|---|---|---|---|---|
| 2006/0246903 A1* | 11/2006 | Kong et al. | .................... | 455/437 |
| 2008/0280612 A1* | 11/2008 | Bornier et al. | ................ | 455/436 |
| 2008/0305768 A1* | 12/2008 | Nylander et al. | ............. | 455/410 |
| 2010/0061337 A1* | 3/2010 | Hallenstal et al. | ............ | 370/331 |

OTHER PUBLICATIONS

3GPP 1543.055: DTM call establishment procedures in GERAN.

3GPP TS43.129: PS handover procedures.

"Digital cellular telecommunications system (Phase 2+); Dual Transfer Mode (DTM); Stage 2 (3GPP TS 43.055 version 6.14.0 Release 6); ETSI TS 143 055", ETSI Standards, LIS, vol. 3-G1, No. V6.14.0, Sep. 1, 2006, XP014035774, ISSN: 0000-0001.

"3rd Generation Partnership Project; Technical Specification Group Services and System Aspects; Voice Call Continuity between CS and IMS; Stage 2 (Release 7)"; 3rd Generation Partnership Project (3GPP); Technical Specification (TS), XX, XX, vol. 23.206, No. v1.2.0, Aug. 1, 2006, pp. 1-34, XP002442269.

"International Search Report and the Written Opinion of the International Searching Authority", received in corresponding PCT Application No. PCT/IB2007/004019, Dated May 26, 2008, 15 pages.

* cited by examiner

CS call and associated "VoIP standby" call in GERAN

Establishment of a mobile originated "VoIP Standby" session while in dedicated mode although no CS reallocation needed in this case compared to DTM Establishment of a mobile originated "VoIP Standby" PS
session in multislot configuration while in dedicated mode Establishment of the "VoIP Standby" network initiated Inter-RAT DTM Handover from GERAN *A/Gb mode* to UTRAN, preparation phase [3GPP TS43.055]

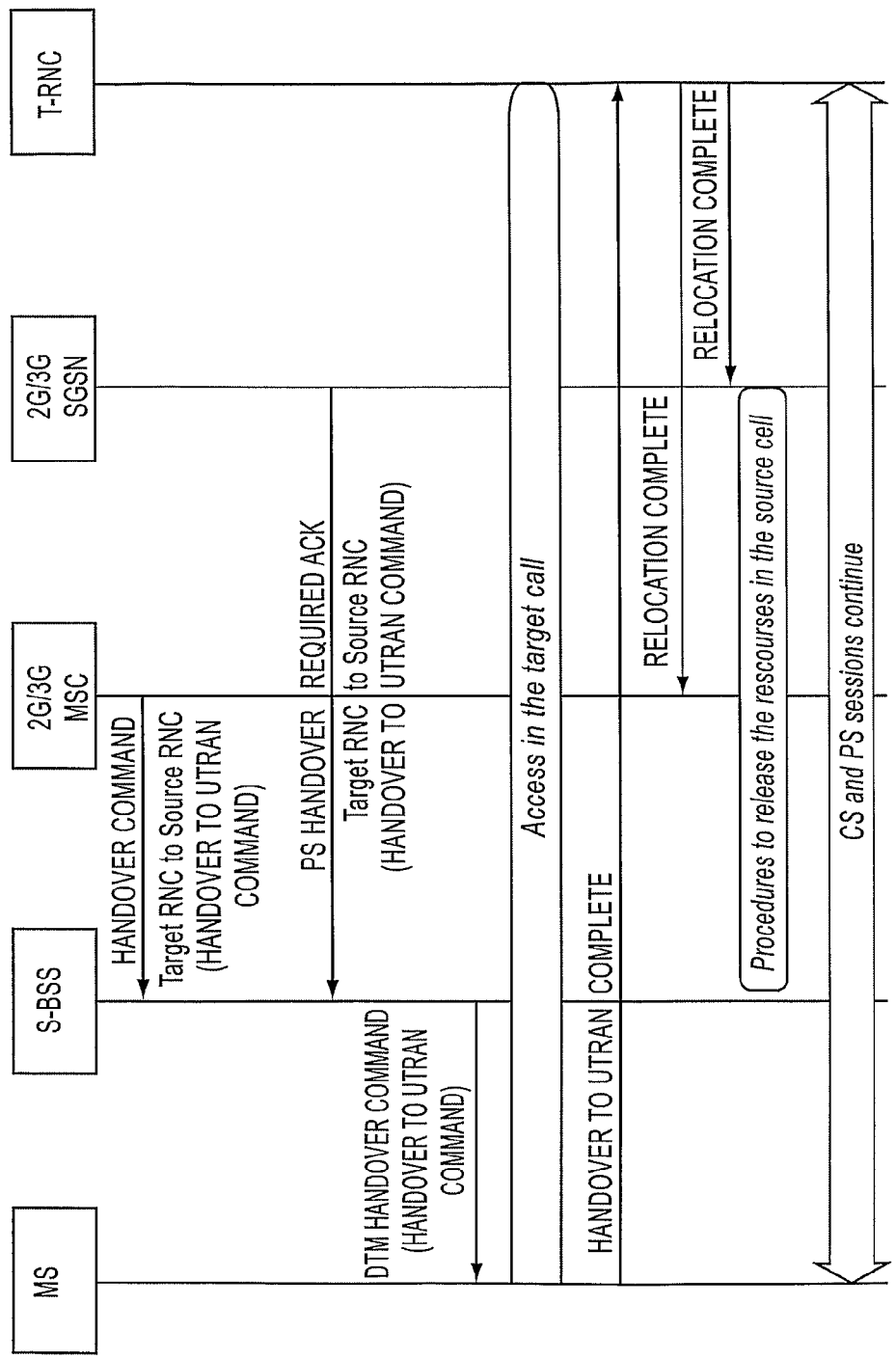

Example of signaling flow of the handover of the GERAN A/Gb mode CS call to the LTE VoIP call ed as PCT Application
METHOD OF HANDOVER OF CIRCUIT-SWITCHED VOICE CALL TO PACKET-SWITCHED VOICE CALL

RELATED APPLICATION

This application was originally filed as PCT Application No. PCT/IB2007/004019 filed Dec. 19, 2007, which claims priority to U.S. Provisional Application No. 60/877,620 filed Dec. 29, 2006.

BACKGROUND OF THE INVENTION

1. Field of the Invention

In technical specifications associated with the third generation partnership project (3GPP), the definition of long term evolution (LTE) systems and devices continues. Certain embodiments of the present invention are generally related to methods, systems, and devices that can provide transitions between GSM/EDGE (Global System for Mobile communication, Enhanced Data rate for GSM Evolution) radio access networks (GERAN) and evolved universal mobile telecommunication system (UMTS), long term evolution radio access network (E-UTRAN/LTE) in order to provide seamless mobility across different technologies.

Handovers between GERAN and E-UTRAN/LTE technologies with a minimum of service disruption may be desirable in the development of such technologies. Both high QoS (Quality of Service) requirements of LTE technology and various inter-operability among the numerous technologies are important, and their maintenance is desirable.

2. Description of the Related Art

Handover of a circuit switched (CS) voice call to a E-UTRAN voice-over-Internet-protocol (VoIP) call and vice versa can be challenging. There is currently no circuit-switched domain in E-UTRAN, and interfaces to the circuit-switched domain are lacking. Certain embodiments of the present invention, therefore, are directed to performing the handover of a circuit-switched voice call to a VoIP call from GERAN to E-UTRAN in a seamless manner, without any service disruption or degradation. There are currently no suitable solutions to this problem.

SUMMARY OF THE INVENTION

Certain embodiments of the present invention relate to a method including detecting or establishing a circuit-switched call. The method also can include establishing a voice-over-Internet-protocol standby call in parallel to the circuit-switched call. The method further can include activating the voice-over-internet-protocol standby call to become an active voice-over-internet protocol call when a handover situation is detected. The method additionally can include releasing resources of the circuit-switched call when the voice-over-internet-protocol standby call becomes the active voice-over-internet protocol call.

Certain embodiments of the present invention can relate to an apparatus including an initiation unit configured to detect or establish a circuit-switched call. The apparatus can also include an establishment unit configured to establish a voice-over-internet-protocol standby call in parallel to the circuit-switched call. The apparatus can further include an activation unit configured to activate the voice-over-internet-protocol standby call to become an active voice-over-internet protocol call when a handover situation is detected. The apparatus can additionally include a release unit configured to release resources of the circuit-switched call when the voice-over-internet-protocol standby call becomes the active voice-over-internet protocol call.

Certain embodiments of the present can relate to a computer program embodied on a computer-readable medium, comprising instructions for performing a method when executed on a device. The method can include detecting or establishing a circuit-switched call. The method can also include establishing a voice-over-internet-protocol standby call in parallel to the circuit-switched call. The method can further include activating the voice-over-internet-protocol standby call to become an active voice-over-internet protocol call when a handover situation is detected. The method can additionally include releasing resources of the circuit-switched call when the voice-over-Internet-protocol standby call becomes the active voice-over-internet protocol call.

Certain embodiments of the present invention can relate to an apparatus including initiation means for detecting or establishing a circuit-switched call. The apparatus can also include establishment means for establishing a voice-over-Internet-protocol standby call in parallel to the circuit-switched call. The apparatus can further include activation means for activating the voice-over-Internet-protocol standby call to become an active voice-over-Internet protocol call when a handover situation is detected. The apparatus can additionally include release means for releasing resources of the circuit-switched call when the voice-over-internet-protocol standby call becomes the active voice-over-internet protocol call.

BRIEF DESCRIPTION OF THE DRAWINGS

For proper understanding of the invention, reference should be made to the accompanying drawings, wherein:

FIG. 5b illustrates the execution phase of handover from GERAN A/Gb mode to UTRAN.

DETAILED DESCRIPTION OF THE PREFERRED EMBODIMENTS

Certain embodiments of the present invention, therefore, are directed to such handovers. Certain embodiments of the present invention can utilize, for example, dual transfer mode (DTM) call establishment procedures, as specified, for example, in 3GPP document TS43.055, and packet-switched handover procedures as specified in 3GPP document TS43.129.

DTM is a mode that is applicable for a mobile station that supports GPRS (general packet radio service). A mobile station operating in dual transfer mode includes resources for a radio resource connection and is simultaneously allocated resources for one or more temporary GPRS connection block flows, provided that the base station subsystem (BSS) coordinates its allocation of radio resources. DTM is optional for the mobile station and for the network. For user equipment such as mobile terminals based on LTE technology, dual transfer mode call establishment may be utilized to establish a circuit-switched call, and then to initiate a VoIP standby call using dual transfer mode principles for establishment of a packet-switched call.

Figure 1:
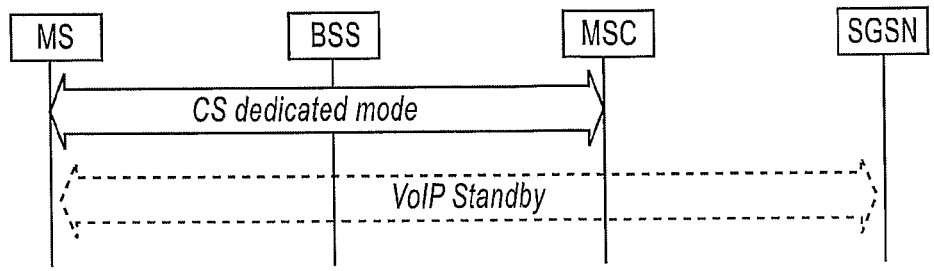
FIG. 1 illustrates a circuit-switched call and associated voice-over-internet-protocol standby call in GERAN.

Referring to FIG. 1, a configuration of a dedicated circuit-switched call, and associated VoIP standby call, is illustrated in a GSM/EDGE radio access network. VoIP standby, as utilized in the present invention, is a virtual call that utilizes no physical radio resources: a signaling path is established end-to-end, and remains ready to use. However, the call does not need to be activated in the GSM/EDGE radio access network unless there is a need for it, and then only if the radio resources and associated mechanisms are available. Once the circuit-switched call has been established, and VoIP standby has been established, the network may initiate a handover for both calls as needed.

During handover to non-E-UTRAN cells, the network can be configured to perform dual transfer mode handover such that the signaling path for the VoIP standby is preserved when moving to a new cell. During handover to E-UTRAN, there would only be a packet-switched handover of the VoIP standby call to the E-UTRAN, while the circuit-switched call in GERAN would be released upon successful completion of the handover. The VoIP standby call would be activated in E-UTRAN upon successful access in the new cell.

An inter-RAT (Radio Access Technology) dual transfer mode handover is discussed, for example, in 3GPP document TS43.055. RAT, as noted above, is defined as radio access technology; such technology is used to connect different terminals and applications to telecommunication networks, using radio frequency signals. Such handovers include a preparation phase that allocates circuit switched a packet-switched (PS) resources in a target cell, and an execution phase that includes sending of a handover command message from the network to the mobile station for the inter-RAT dual transfer mode handover procedure from UTRAN to GERAN A/b mode.

The message can contain a handover-to-UTRAN command, or a handover-from-UTRAN command. The handover command message describes both the circuit-switched and packet-switched resources in the target cell.

Figure 2:
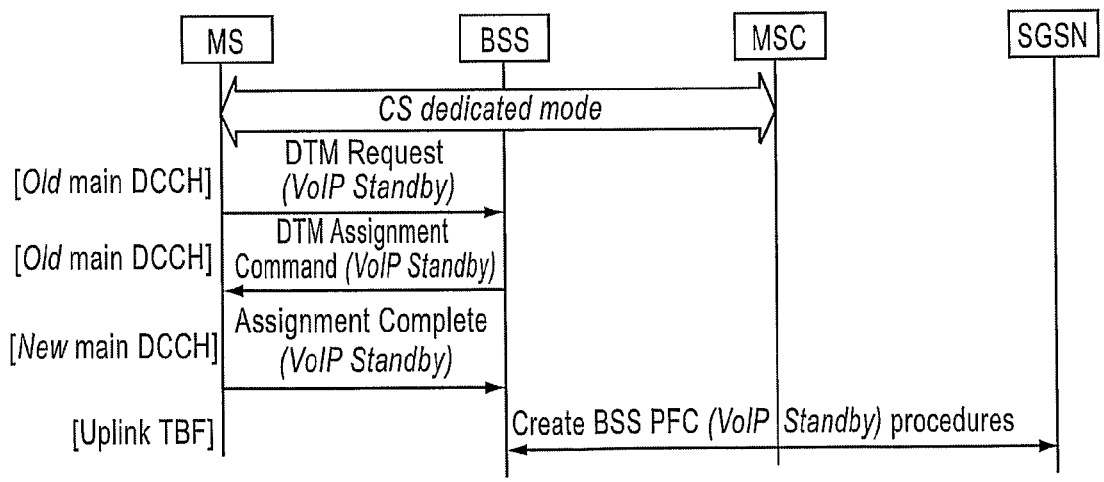
FIG. 2 illustrates establishment of a mobile originated voice-over-internet-protocol standby call in a dedicated mode, without the need for circuit-switched reallocation.

In one embodiment, an E-UTRAN LTE capable mobile station (MS) can initiate a packet-switched session for a VoIP standby call for each circuit-switched call by first utilizing a DTM signaling, i.e. DTM assignment command based on the system information if there is an E-UTRAN neighboring cell, or a DTM request based on the system information. As illustrated in FIG. 2, a mobile originated VoIP standby session is established while in a dedicated mode, while no circuit-switching reallocation is needed differently from dual transfer mode procedures described in TS43.055.

Figure 3:
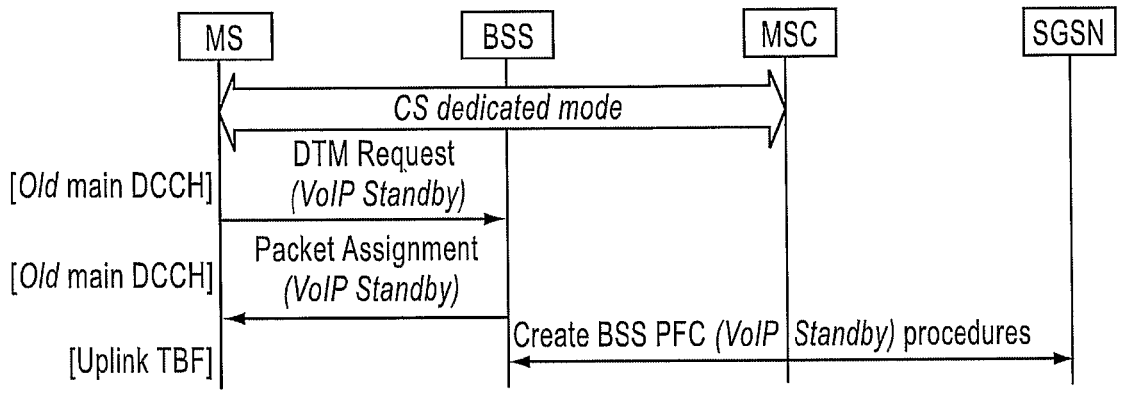
FIG. 3 illustrates establishment of a mobile originated voice-over-internet-protocol standby call in multislot configuration while in dedicated mode.

FIG. 3 illustrates the establishment of a mobile originated VoIP standby packet-switched session in a multi-slot configuration while in a dedicated mode via DTM request.

Figure 4:
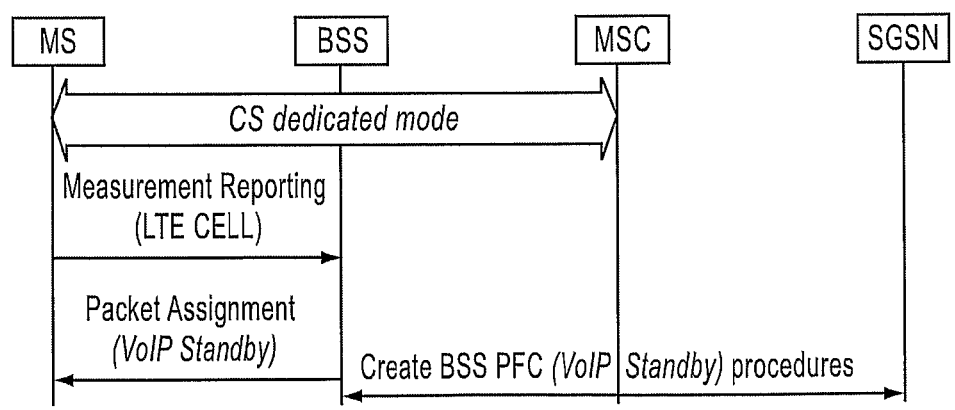
FIG. 4 illustrates establishment of a network originated voice-over-internet-protocol standby call.

The establishment of VoIP standby call may be initiated by the network. Referring to FIG. 4, the establishment of the VoIP standby packet-switched session is initiated by the network through for example measurement reporting, packet assignment procedure, and creation of the base station subsystem packet flow context.

The VoIP standby mode can be implemented with only minor changes in current GERAN dual transfer mode signaling messages. An indicator/identifier that identifies the VoIP call as a virtual call can be utilized where the core network (CN) signaling needs to be established, but no radio resources are required. No architectural changes, however, are necessary. A minor change may also be utilized in the DTM handover, in order to specify situations where handovers to E-UTRAN allow packet-switching to continue without a circuit switching. Service gap may be reduced to a minimum due to the fact that the VoIP signaling connection can be established prior to the handover taking place.

Figure 5A:
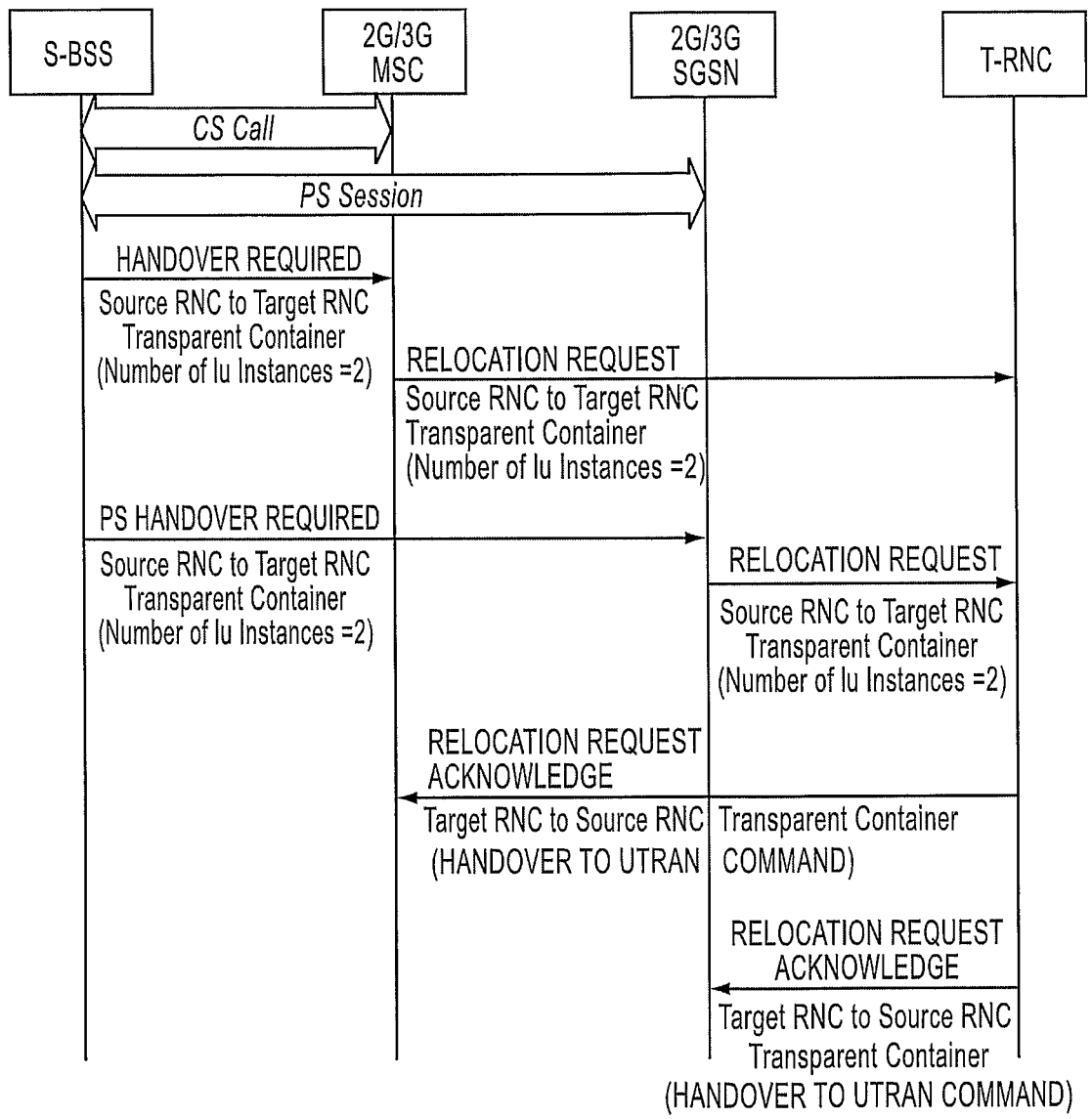
FIG. 5a illustrates the preparation phase of handover from GERAN A/Gb mode to UTRAN.

Handover to E-UTRAN can be initiated by the source BSS in the GERAN A/Gb mode cell following the PS handover principles. BSS will only initiate PS handover signaling for the "VoIP standby" call instead of the DTM handover that initiates handover for both CS and PS call simultaneously. Referring to FIG. 5a, an inter-RAT dual transfer mode handover is illustrated from a GERAN A/Gb mode to UTRAN is illustrated, regarding the preparation phase. FIG. 5b illustrates the execution phase. These figures illustrate the exchange of messages in successful preparation and execution phases.

Figure 6:
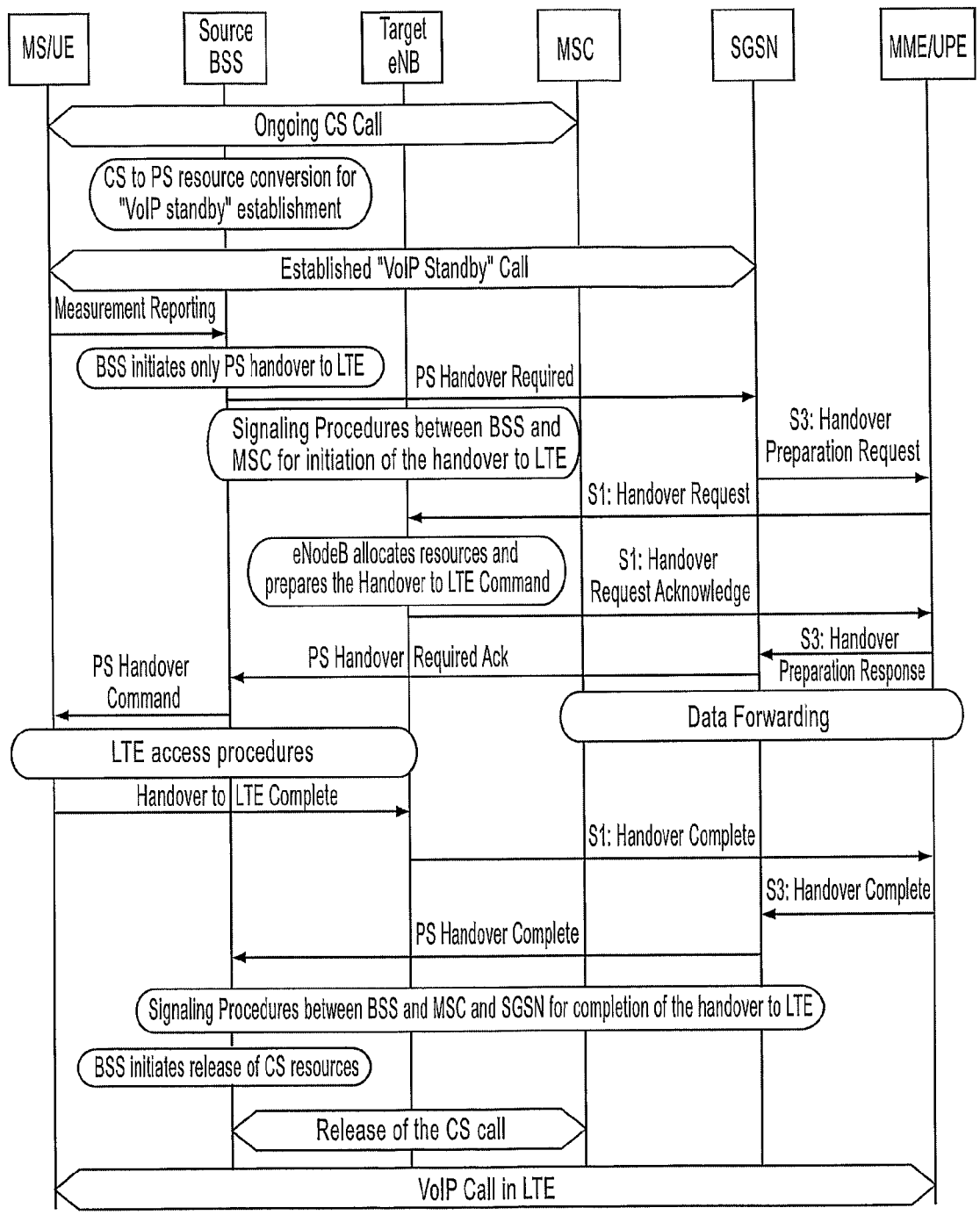
FIG. 6 illustrates the handover from GERAN A/Gb mode CS call to LTE VoIP call.

FIG. 6 illustrates signaling flow of a handover from the GERAN A/Gb mode circuit-switched call to an E-UTRAN VoIP call. As noted above, once the VoIP call has been established in E-UTRAN, the circuit-switched call in GERAN A/Gb mode can be released.

It is important to note that a VoIP standby call according to certain embodiments of the present invention is, as mentioned previously, the establishment of the end-to-end connection, but without utilizing any physical radio resources, and not transmitting any call content data.

Figure 7:
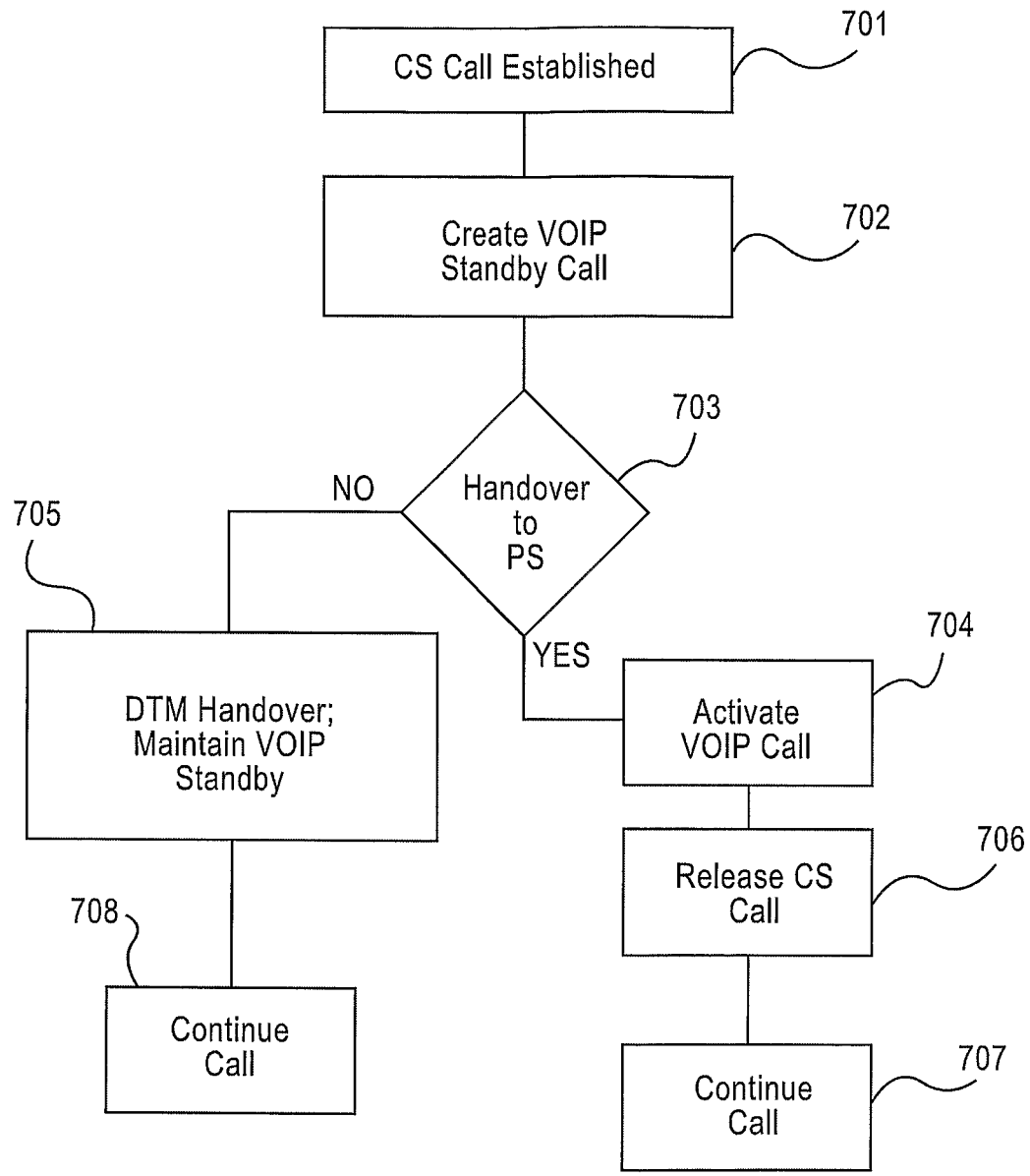
FIG. 7 illustrates a method according to the present invention.

Seamless handover of a circuit-switched voice call to a packet-switched VoIP call in E-UTRAN is therefore performed by an E-UTRAN capable terminal establishing a VoIP standby call. Referring to FIG. 7, it can be seen that a circuit-switched call is established at 701. The mobile terminal or network then creates, at 702, a VoIP standby call. In situations during handover to a non E-UTRAN cell, such as GERAN A/Gb mode, a DTM handover occurs such that the signaling path for the VoIP standby call is preserved, at 705, during handover to E-UTRAN or other packet-switched configuration, the VoIP standby call is handed over and activated, at 704. Upon successful handover to the VoIP/Packet switched communication, the circuit-switched call is released, at 706. At 707 or 708, as appropriate, the call is continued.

In this situation, the handover to E-UTRAN can be initiated by the source base station subsystem in the GERAN A/Gb mode cell, following packet-switching handover principles. The source base station subsystem can initiate the DTM handover simultaneously for both the circuit-switched and packet-switched calls. However, in case of handover to E-UTRAN the base station subsystem will only initiate packet switching handover signaling for the VoIP standby call, rather than the DTM handover. The Mobile Switching Center (MSC) will be informed regarding the initiation of the packet-switching handover.

Figure 8:
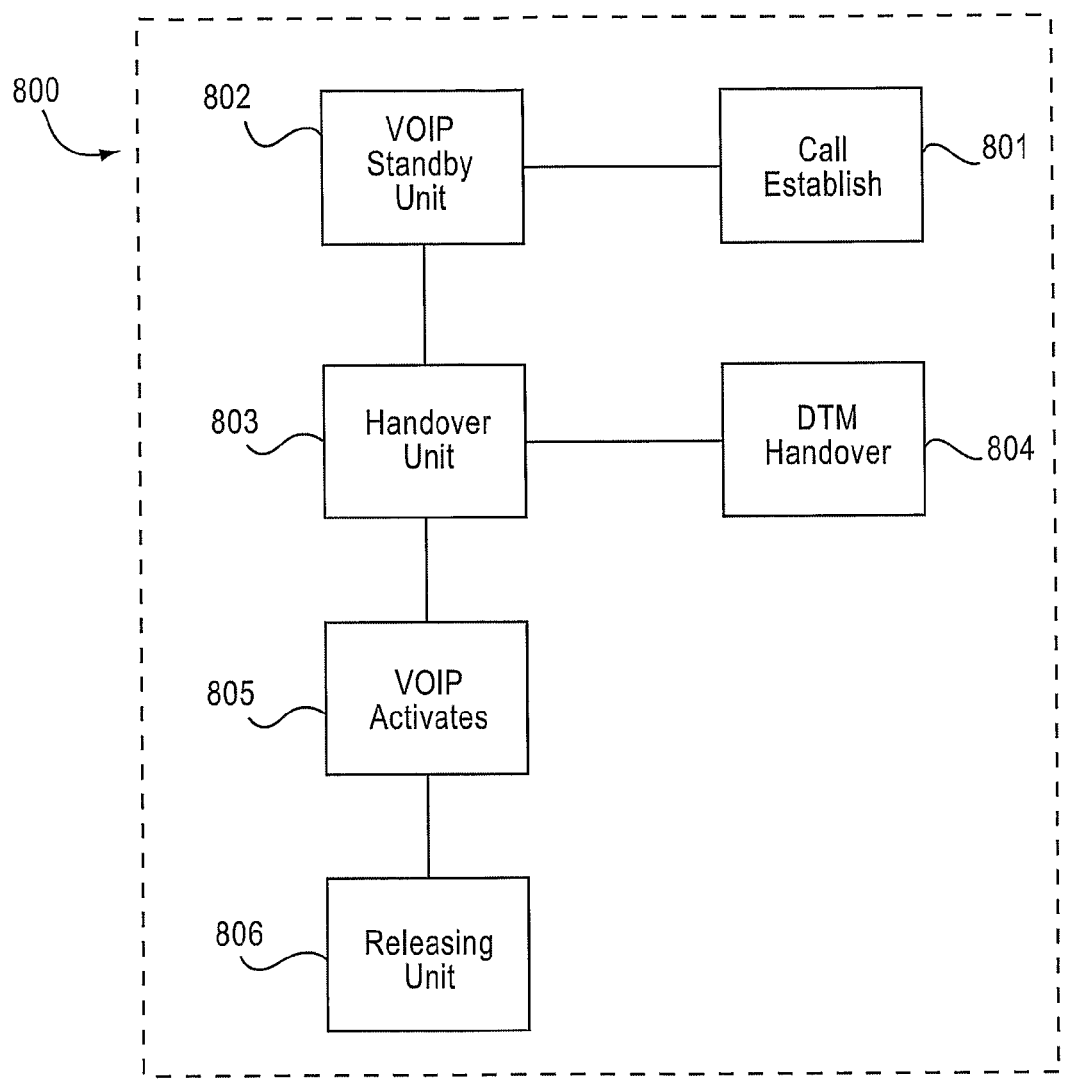
FIG. 8 illustrates a network device according to the present invention.

FIG. 8 illustrates a configuration of a network device, such as a mobile terminal, that can implement an embodiment of the present invention. A mobile terminal 800 can include a call establishment unit 801 that can establish CS or PS calls. The VoIP standby unit 802 is configured to establish a VoIP standby call, which can facilitate domain change for an ongoing CS call, using dual transfer mode principles. Handover unit 803 can initiate handover at the time of domain change.

If the handover is not a handover to an E-UTRAN system, a DTM handover occurs wherein the CS call is handed over, as well as the VoIP standby call established by VoIP standby unit 802. The CS call and the VoIP standby call are therefore maintained. In situations, however, where the handover is to a domain such as packet-switching domain, VoIP activation unit 805 activates the VoIP call. After VoIP activation is established, releasing unit 806 releases the circuit-switched call. For non E-UTRAN systems noted above, DTM handover unit 804 handles the DTM handover, and maintains the CS call and the VoIP standby call. The determination of the neighboring cell as being E-UTRAN or non E-UTRAN, is performed in a conventional manner.

Figure 9:
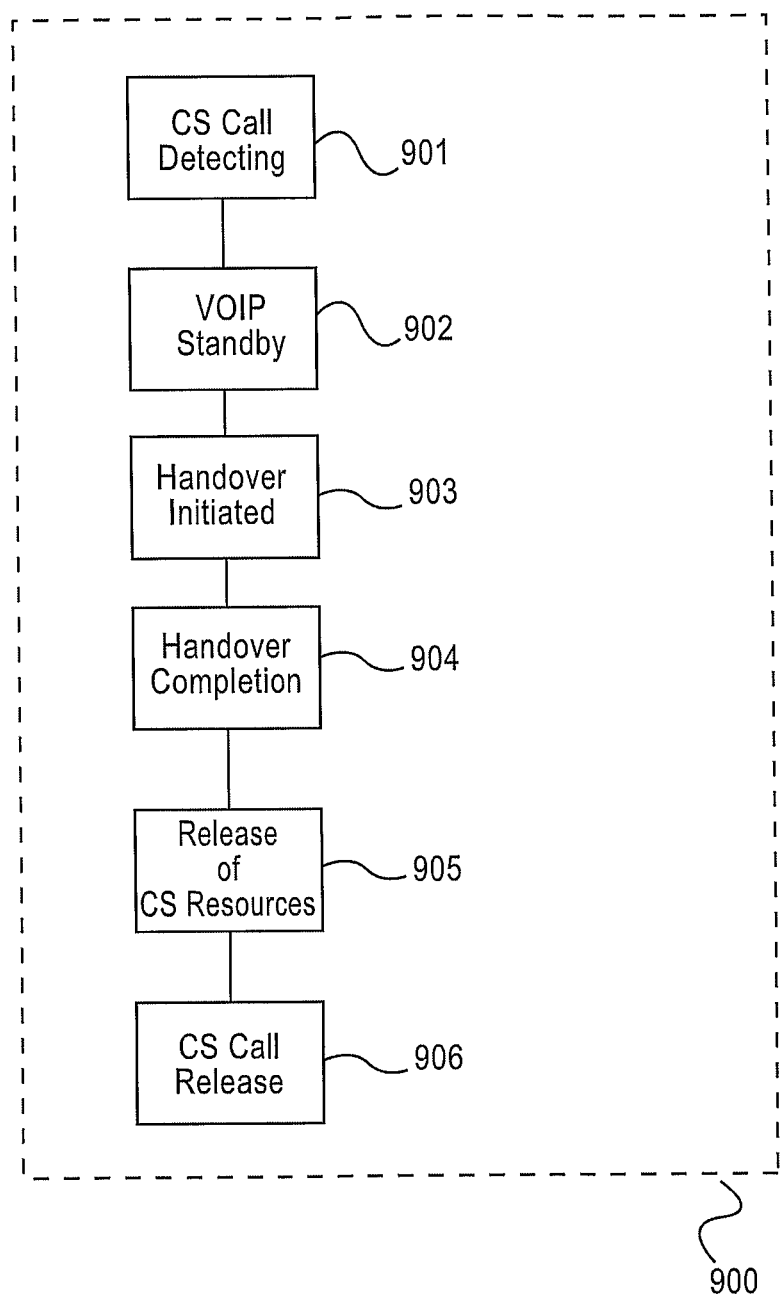
FIG. 9 illustrates a base station subsystem according to the present invention.

FIG. 9 illustrates an example of a structure of a base station subsystem (BSS) according to certain embodiments of the present invention. BSS 900 can include, in certain embodiments, a detecting unit 901 for detecting the existence of an ongoing CS call. CS to PS resource conversion unit 902 is establishes the VoIP standby call. Upon receiving appropriate measurement reporting data, handover unit 903 initiates a PS handover to LTE. Appropriate handover signaling occurs, for example, between BSS 900 and the mobile switching center (MSC). Upon determination of appropriate signaling by 904 that the handover to PS is complete, BSS 900 employs release unit 905 to initiate release of CS resources. At 906, the CS call is released, and the call then continues as a PS call using LTE/E-UTRAN resources.

Figure 10:
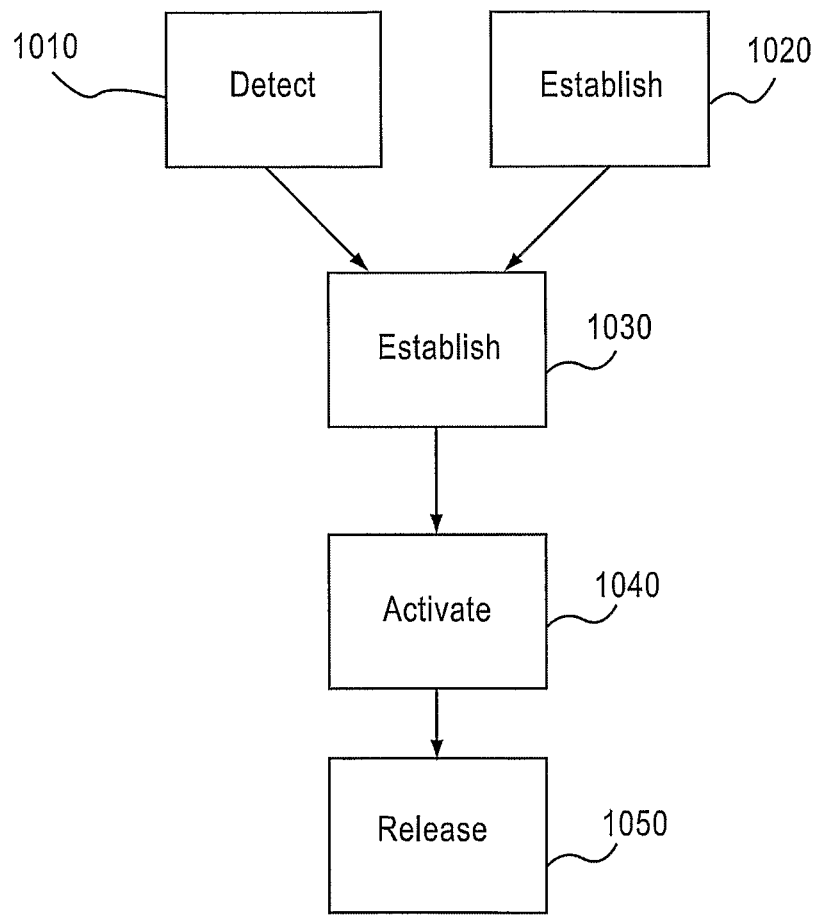
FIG. 10 illustrates a method according to the present invention.

FIG. 10 illustrates an example of a method according to certain embodiments of the present invention. The method includes detecting 1010 or establishing 1020 a circuit-switched call. The method also includes establishing 1030 a voice-over-internet-protocol standby call in parallel to the circuit-switched call. The method further includes activating 1040 the voice-over-internet-protocol standby call to become an active voice-over-internet protocol call when a handover situation is detected. The method additionally includes releasing 1050 resources of the circuit-switched call when the voice-over-internet-protocol standby call becomes the active voice-over-internet protocol call.

The releasing 1050 the resources of the circuit-switched call can include terminating the circuit-switched call. The method can be performed by a mobile station, and the method can, in such a case, include the establishing 1020 the circuit-switched call. Alternatively, or in addition, method can be performed by a base station (or more specifically a base station subsystem), and the method can, in such a case, include the detecting 1010 the circuit-switched call.

The method can utilize dual transfer mode call establishment procedures. The method can generally conform to the call establishment and packet-switched handover procedures defined by third generation partnership project. The method can be coordinated between a mobile station and a base station. As illustrated in various of the drawings, other network elements such as an SGSN (Serving GPRS Support Node) can be involved.

The method can be performed at least partially in a global system for mobile communication, enhanced data rate for global system for mobile communication evolution radio access network. Additionally, the method can be performed at least partially in a evolved universal mobile telecommunication system, long term evolution network.

In method discussed above, the voice-over-Internet-protocol standby call can be a virtual call that utilizes no physical radio resources, yet includes an established, end-to-end signaling path that is ready to be used. The handover situation discussed above, can include an inter-radio-access-technology dual transfer mode handover.

The method can be performed using a computer program. For example, a computer program embodied on a computer readable medium, such as a compact disc, hard drive, electronically programmable random access memory, or the like, can include instructions for performing the method when executed on a device, such as the device illustrated in FIG. 11.

Figure 11:
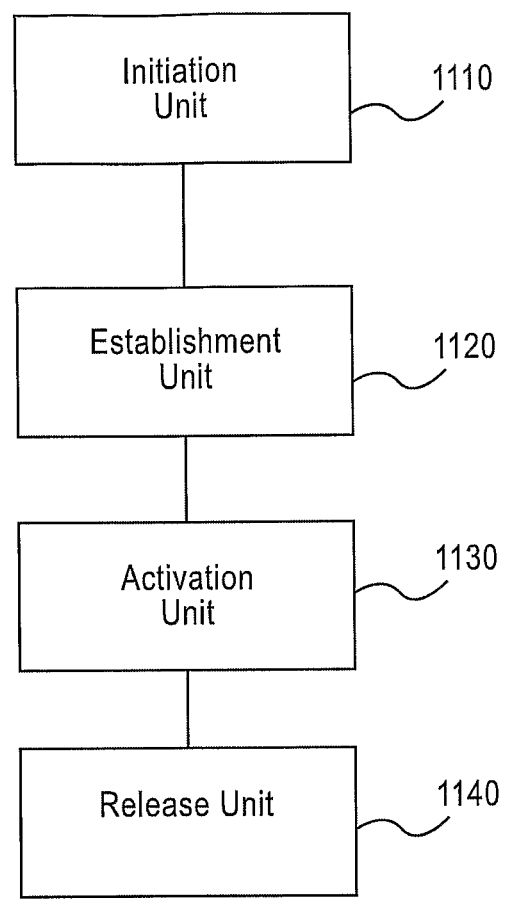
FIG. 11 illustrates an apparatus according to the present invention.

FIG. 11 illustrates an apparatus according to an embodiment of the present invention. The apparatus includes an initiation unit 1110 configured to detect or establish a circuit-switched call. The apparatus also includes an establishment unit 1120 configured to establish a voice-over-internet-protocol standby call in parallel to the circuit-switched call. The apparatus further includes an activation unit 1130 configured to activate the voice-over-internet-protocol standby call to become an active voice-over-internet protocol call when a handover situation is detected. The apparatus additionally includes a release unit 1140 configured to release resources of the circuit-switched call when the voice-over-interne-protocol standby call becomes the active voice-over-interne protocol call.

The apparatus can be included in a mobile station, and the apparatus can be, in such an example, configured to establish the circuit-switched call. Alternatively, or additionally, the apparatus can be included in base station (or more particularly, for example, a base station subsystem), and the base station can be configured, in such an example, to detect the circuit-switched call.

The apparatus can be configured to utilize dual transfer mode call establishment procedures. The apparatus can also be configured to conform to the call establishment and packet-switched handover procedures defined by third generation partnership project.

The apparatus can be at least partially in a global system for mobile communication, enhanced data rate for global system for mobile communication evolution radio access network. The apparatus can also (or alternatively) be at least partially in a evolved universal mobile telecommunication system, long term evolution network.

The devices as discussed above can be implemented in various hardware, software, and hybrid combinations thereof. For example, a general purpose computer, an application specific integrated circuit, or a programmable processor chip can be used to provide the functional units discussed above. In the example of a programmable processor chip, the chip can be configured to serve as each of the functional units disclosed above: in other words, there is no absolute requirement that the different functional units be physically separate. On the other hand, there is also no requirement that the different functional units be physically united on a single chip, although such an embodiment that is physically integrated may have certain advantages.

The above descriptions of embodiments of certain embodiments of the present invention are submitted for illustrative purposes only. It would be apparent to a person of ordinary skill in the art that numerous modifications and changes could be made while maintaining the spirit and scope of the invention. In order to determine the metes and bounds of the invention, therefore, reference should be made to the appended claims.

What is claimed is:

1. A method comprising:
   detecting or establishing a circuit-switched call over a cellular network;
   establishing, over a cellular network, a voice-over-internet-protocol standby call in parallel to the circuit-switched call, wherein the voice-over-internet-protocol standby call is a standby, virtual call that includes an established end-to-end signaling path but utilizes no physical radio resources, wherein the end-to-end signaling path is ready for use after a cellular handover situation to an active voice-over-internet protocol call established using the end-to-end signaling path;
   detecting the cellular handover situation;
   when the detected cellular handover situation is to a first type of network:
      activating the voice-over-internet-protocol standby call to become the active voice-over-internet protocol call, and
      releasing resources of the circuit-switched call, when the active voice-over-internet protocol call is established; and
   when the detected cellular handover situation is to a second type of network, wherein the second type of network is different from the first type of network:
      performing the cellular handover using dual transfer mode signaling, and
      maintaining the voice-over-internet protocol standby call in a standby state.

2. The method of claim 1, wherein the method is coordinated between a mobile station and a base station.

3. The method of claim 1, wherein the handover situation comprises an inter-radio-access-technology dual transfer mode handover.

4. An apparatus, comprising:
   an initiation unit configured to detect or establish a circuit-switched call;
   an establishment unit configured to establish, over a cellular network, a voice-over-internet-protocol standby call in parallel to the circuit-switched call, wherein the voice-over-internet-protocol standby call is a standby, virtual call that includes an established end-to-end signaling path but utilizes no physical radio resources, wherein the end-to-end signaling path is ready for use after a cellular handover situation to an active voice-over-internet protocol call established using the end-to-end signaling path;
   a handover unit configured to detect a cellular handover situation;
   when the detected cellular handover situation is to a first type of network:
      an activation unit activates the voice-over-internet-protocol standby call to become the active voice-over-internet protocol call, and
      a release unit releases resources of the circuit-switched call, when the active voice-over-internet protocol call is established; and
   when the detected cellular handover situation is to a second type of network, wherein the second type of network is different from the first type of network:
      the handover unit performs the cellular handover using dual transfer mode signaling, and
      a voice-over-internet protocol standby unit maintains the voice-over-internet protocol standby call in a standby state.

5. The apparatus of claim 4, wherein the release of the resources of the circuit-switched call comprises termination of the circuit-switched call.

6. The apparatus of claim 4, wherein the apparatus is comprised in a mobile station, and the apparatus is configured to establish the circuit-switched call.

7. The apparatus of claim 4, wherein the apparatus is comprised in a base station, and the base station is configured to detect the circuit-switched call.

8. The apparatus of claim 4, wherein the handover situation comprises an inter-radio-access-technology dual transfer mode handover.

9. A computer program product comprising a non-transitory computer-readable medium encoded with instructions that, when executed by at least one processor, perform at least the following:
   detecting or establishing a circuit-switched call over a cellular network;
   establishing, over a cellular network, a voice-over-internet-protocol standby call in parallel to the circuit-switched call, wherein the voice-over-internet-protocol standby call is a standby, virtual call that includes an established end-to-end signaling path but utilizes no physical radio resources, wherein the end-to-end signaling path is ready for use after a cellular handover situation to an active voice-over-internet protocol call established using the end-to-end signaling path;
   detecting the cellular handover situation;
   when the detected cellular handover situation is to a first type of network:
      activating the voice-over-internet-protocol standby call to become the active voice-over-internet protocol call, and
      releasing resources of the circuit-switched call, when the active voice-over-internet protocol call is established; and
   when the detected cellular handover situation is to a second type of network, wherein the second type of network is different from the first type of network:
      performing the cellular handover using dual transfer mode signaling, and
      maintaining the voice-over-internet protocol standby call in a standby state.

10. The computer program product of claim 9, wherein the releasing the resources of the circuit-switched call comprises terminating the circuit-switched call.

11. The computer program product of claim 9, wherein the method is performed by a mobile station, and the method comprises the establishing the circuit-switched call.

12. The computer program product of claim 9, wherein the method is performed by a base station, and the method comprises the detecting the circuit-switched call.

13. The computer program product of claim 9, wherein the handover situation comprises an inter-radio-access-technology dual transfer mode handover.

14. The method of claim 1, and wherein the voice-over-internet-protocol standby call is identified by an indicator to establish the voice-over-internet-protocol standby call.

* * * * *